US011097362B2

(12) United States Patent
Men

(10) Patent No.: US 11,097,362 B2
(45) Date of Patent: Aug. 24, 2021

(54) CUTTING INSERT HAVING TWO UPPER CUTTING EDGES AND A LOWER CENTRAL PROTUBERANCE WITH FOUR ABUTMENT WALLS DEFINING AN IMAGINARY QUADRILATERAL, AND ROTARY CUTTING TOOL

(71) Applicant: Iscar, Ltd., Tefen (IL)

(72) Inventor: Yuri Men, Haifa (IL)

(73) Assignee: Iscar, Ltd., Tefen (IL)

( * ) Notice: Subject to any disclaimer, the term of this patent is extended or adjusted under 35 U.S.C. 154(b) by 127 days.

(21) Appl. No.: 16/708,826

(22) Filed: Dec. 10, 2019

(65) Prior Publication Data
US 2021/0170504 A1 Jun. 10, 2021

(51) Int. Cl.
B23C 5/10 (2006.01)
B23C 5/22 (2006.01)

(52) U.S. Cl.
CPC .......... B23C 5/1045 (2013.01); B23C 5/2213 (2013.01); B23C 2200/161 (2013.01); B23C 2210/168 (2013.01)

(58) Field of Classification Search
CPC ........ B23C 2200/168; B23C 2200/161; B23C 5/1045; B23C 5/20; B23C 5/202; B23C 5/205; B23C 5/207; B23B 2200/3681; B23B 2200/161; B23B 2200/168; B23B 2200/166; B23B 27/145
See application file for complete search history.

(56) References Cited

U.S. PATENT DOCUMENTS 5,746,549 A 5/1998 Kress et al.
5,904,449 A * 5/1999 Satran ................ B23C 5/202
407/59
(Continued)

FOREIGN PATENT DOCUMENTS

DE 102017000784 A1 * 8/2018 ........... B23C 5/2221
WO WO-2020039981 A1 * 2/2020 ............... B23C 5/10

OTHER PUBLICATIONS

International Search Report dated Mar. 11, 2021, issued in PCT counterpart application (No. PCT/IL2020/051169).
(Continued)

Primary Examiner — Ryan Rufo
(74) Attorney, Agent, or Firm — Womble Bond Dickinson (US) LLP

(57) ABSTRACT

A cutting insert has opposing upper and lower surfaces interconnected by a peripheral side surface, an insert axis passing through the upper and lower surfaces, and first and second upper cutting edges formed at the intersection of the upper surface and the peripheral side surface. A lower central protuberance having first, second, third and fourth abutment walls extends downwardly from the lower surface. In a cross-section taken in a first horizontal plane perpendicular to the insert axis and intersecting the lower central protuberance, the first, second, third and fourth abutment walls define an imaginary quadrilateral having diagonally opposing first and third internal angles and diagonally opposing second and fourth internal angles. The first and third internal angles are equal to each other, and the second and fourth internal angles are not equal to each other. Two cutting inserts are removably secured in a rotary cutting tool.

26 Claims, 8 Drawing Sheets

(56) References Cited

U.S. PATENT DOCUMENTS

| | | | |
|---|---|---|---|
| 6,149,355 A * | 11/2000 | Fouquer | B23C 5/1045 407/113 |
| 6,536,996 B2 | 3/2003 | Satran et al. | |
| 6,575,670 B2 | 6/2003 | Men | |
| 6,607,333 B2 | 8/2003 | Satran et al. | |
| 6,612,207 B2 | 9/2003 | Schiffers | |
| 7,309,193 B2 | 12/2007 | Riviere et al. | |
| 9,573,204 B2 | 2/2017 | Hecht | |
| 9,700,947 B2 | 7/2017 | Dufour et al. | |
| 2002/0037199 A1* | 3/2002 | Satran | B23C 5/207 407/54 |
| 2006/0056926 A1* | 3/2006 | Riviere | B23C 5/2213 407/40 |
| 2006/0056928 A1* | 3/2006 | Riviere | B23C 5/1045 407/113 |
| 2013/0266385 A1 | 10/2013 | Margulis et al. | |
| 2015/0158090 A1 | 6/2015 | Hecht | |
| 2020/0070259 A1* | 3/2020 | Nagafuchi | B23C 5/2221 |

OTHER PUBLICATIONS

Written Opinion dated Mar. 11, 2021, issued in PCT counterpart application (No. PCT/IL2020/051169).

* cited by examiner

CUTTING INSERT HAVING TWO UPPER CUTTING EDGES AND A LOWER CENTRAL PROTUBERANCE WITH FOUR ABUTMENT WALLS DEFINING AN IMAGINARY QUADRILATERAL, AND ROTARY CUTTING TOOL

FIELD OF THE INVENTION

The present invention relates to a rotary cutting tool and a cutting insert having two upper cutting edges and a lower central protuberance with four abutment walls defining an imaginary quadrilateral. The rotary cutting tool is for use in milling operations in general, and in the form of a ball-nose end mill for profiling and copying operations in particular.

BACKGROUND OF THE INVENTION

Within the field of cutting tools used in milling operations, there are some examples of cutting inserts having two upper cutting edges and a lower central protuberance with four abutment walls defining an imaginary quadrilateral.

U.S. Pat. No. 6,536,996 discloses a cutting tool comprising a tool body and two cutting inserts mounted therein. An insert receiving pocket of the tool body has a pocket base wall. An indentation that opens to the pocket base wall has a lower wall that is bounded by first, second, third and fourth side walls. The cutting insert has an insert base wall. A protuberance extends downwards from the insert base wall and has a lower wall bounded by first, second, third and fourth lateral walls. The insert base wall abuts the pocket base wall, the first lateral wall abuts the first side wall, the third lateral wall abuts the third side wall, the first lateral wall is distanced from a center line by a first distance, the cutting edge close to the center line is distanced therefrom by a second distance where the first distance is at least three times greater than the second distance and where a relief surface of the cutting insert is relieved from the insert receiving pocket.

U.S. Pat. No. 9,573,204 discloses a cutting tool and a cutting insert, each of which includes a base surface and an anti-slip arrangement adjacent thereto. The anti-slip arrangement of the cutting insert includes an insert actuator surface and non-parallel first and second insert abutment surfaces formed on a single protuberance in a central area of the insert base surface. The anti-slip arrangement of the tool includes first and second tool abutment surfaces recessed into the tool base surface, and a clamp comprising a tool actuator surface. The cutting insert is mounted on the cutting tool via engagement of the base surfaces thereof and the clamp is operable to bias the actuator surfaces against each other and thereby force the first and second abutment surfaces against each other, for preventing slippage of the cutting insert along the tool's base surface.

SUMMARY OF THE INVENTION

In accordance with the present invention, there is provided a cutting insert comprising opposing upper and lower surfaces interconnected by a peripheral side surface and an insert axis passing through the upper and lower surfaces,
  an upper peripheral edge at the intersection of the upper surface and the peripheral side surface, the upper peripheral edge having first and second upper cutting edges, and
  a lower central protuberance extending downwardly from the lower surface and away from the upper surface, the lower central protuberance including first, second, third and fourth abutment walls transverse to the lower surface, the first, second, third and fourth abutment walls successively arranged on an envelope surface extending around a perimeter of the lower central protuberance,
  wherein in a cross-section taken in a first horizontal plane perpendicular to the insert axis and intersecting the envelope surface, the first, second, third and fourth abutment walls define an imaginary quadrilateral having diagonally opposing first and third internal angles and diagonally opposing second and fourth internal angles,
  wherein the imaginary quadrilateral has first, second, third and fourth sides associated with the first, second, third and fourth abutment walls, respectively, the first internal angle formed between the first and second sides, the second internal angle formed between the second and third sides, the third internal angle formed between the third and fourth sides, and the fourth internal angle formed between the fourth and first sides, and
  wherein the first and third internal angles are equal to each other, and the second and fourth internal angles are not equal to each other.

Also, in accordance with the present invention, there is provided a rotary cutting tool rotatable about a tool axis in a direction of rotation, comprising a tool body having first and second insert receiving pockets, and one cutting insert of the sort described above removably secured in each of the first and second insert receiving pockets.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

Figure 1:
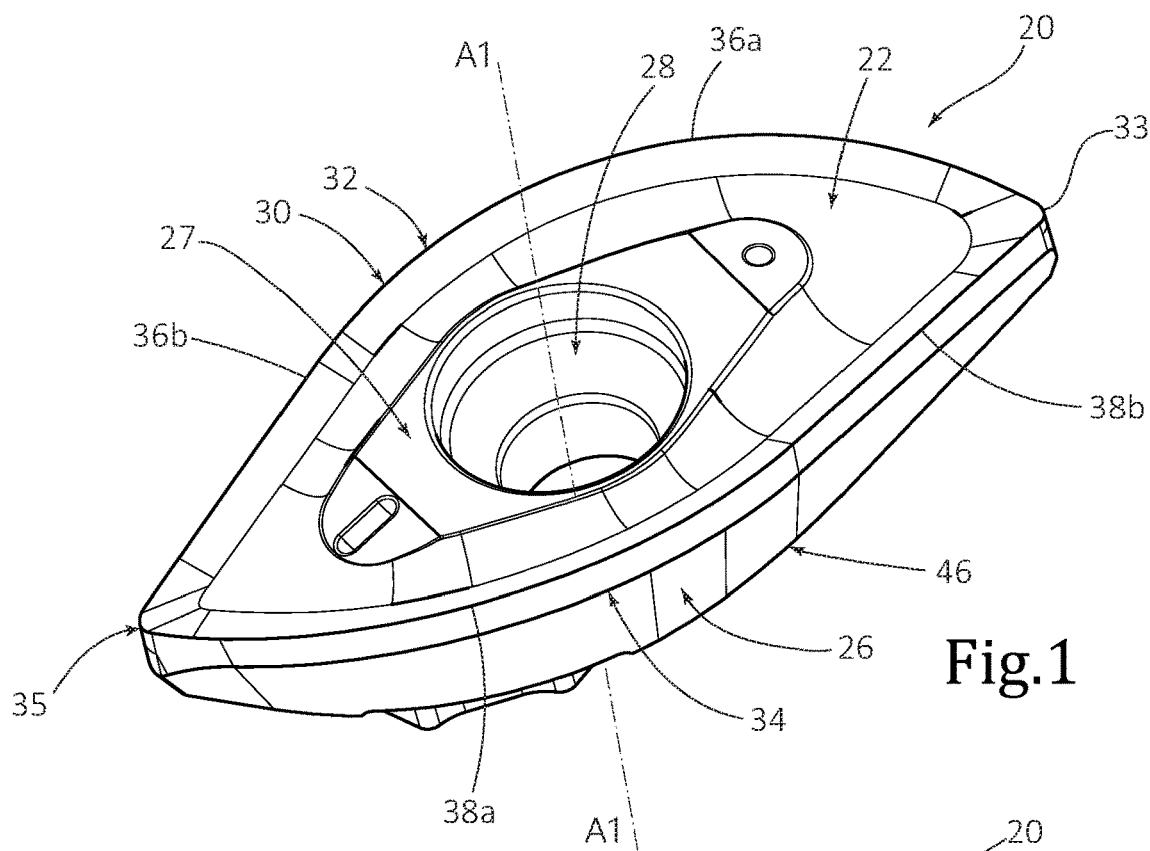
FIG. 1 is an upper perspective view of a cutting insert in accordance with some embodiments of the present invention.

As shown in FIGS. 1 to 6, one aspect of the present invention relates to a cutting insert 20 having opposing upper and lower surfaces 22, 24 interconnected by a peripheral side surface 26, and an insert axis A1 passing through the upper and lower surfaces 22, 24 (or more precisely, passing through planes defined by the upper and lower surfaces).

In some embodiments of the present invention, the lower surface 24 may be planar.

Also, in some embodiments of the present invention, a through bore 28 may extend along the insert axis A1.

Further, in some embodiments of the present invention, the cutting insert 20 may preferably be manufactured by form pressing and sintering a cemented carbide, such as tungsten carbide, and may be coated or uncoated.

Figure 3:
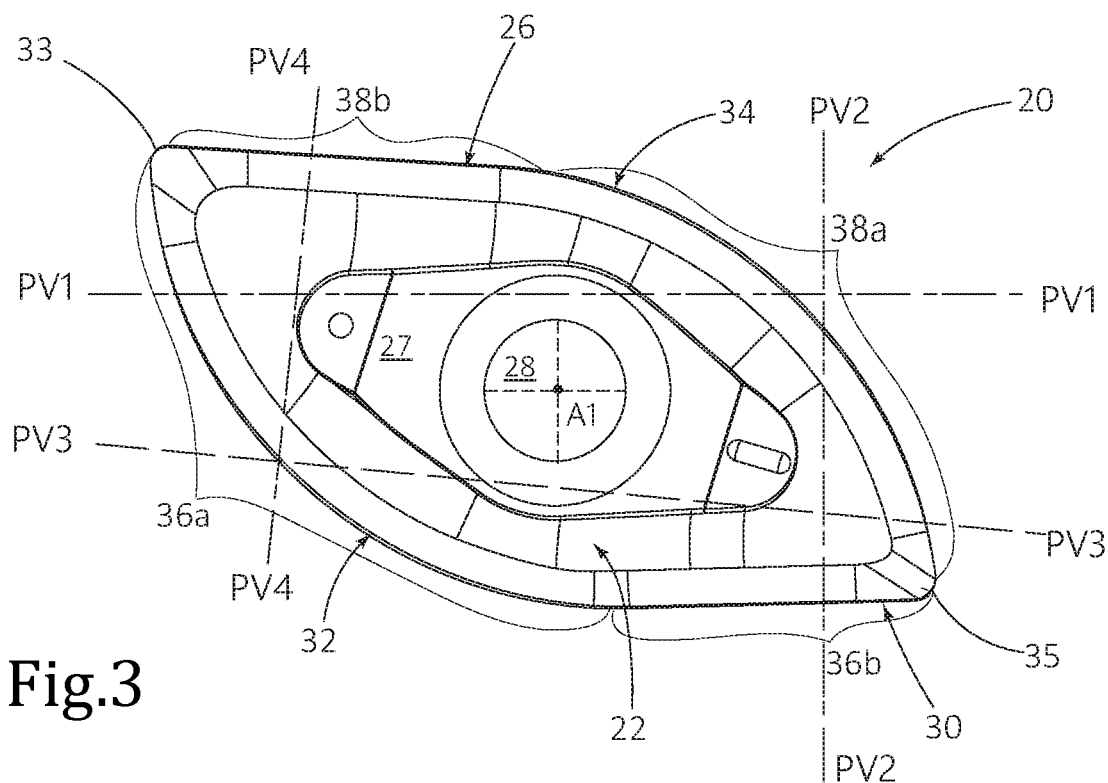
FIG. 3 is a top view of the cutting insert shown in FIG. 1.

As shown in FIGS. 1 and 3, the upper surface 22 may include a planar upper central region 27.

In some embodiments of the present invention, the through bore 28 may intersect the upper central region 27.

As shown in FIGS. 1 and 3, a continuous upper peripheral edge 30 is formed at the intersection of the upper surface 22 and the peripheral side surface 26, the upper peripheral edge 30 having first and second upper cutting edges 32, 34.

In some embodiments of the present invention; the upper peripheral edge 30 may not exhibit rotational symmetry about the insert axis A1.

Also, in some embodiments of the present invention, the first and second upper cutting edges 32, 34 may be non-identical.

Further, in some embodiments of the present invention, the first and second upper cutting edges 32, 34 may be spaced apart by opposing first and second nose edges 33, 35.

As shown in FIGS. 1 and 3, the first upper cutting edge 32 may include a first major cutting edge portion 36a and a first minor cutting edge portion 36b, and the second upper cutting edge 34 may include a second major cutting edge portion 38a and a second minor cutting edge portion 38b.

In some embodiments of the present invention, in a top view of the cutting insert 20, as shown in FIG. 3, each of the first and second major cutting edge portions 36a, 38a may have an outwardly convex shape, and each of the first and second minor cutting edge portions 36b, 38b may be straight.

Figure 5:
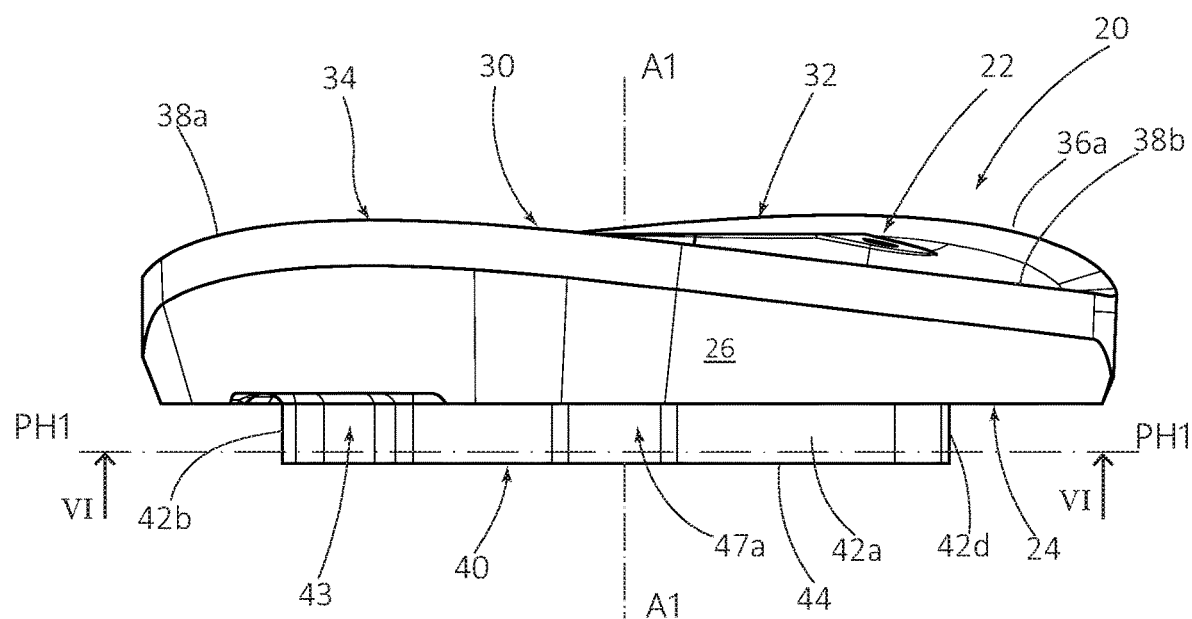
FIG. 5 is a side view of the cutting insert shown in FIG. 1.

Also, in some embodiments of the present invention, in a side view of the cutting insert 20, as shown in FIG. 5, each of the first and second major cutting edge portions 36a, 38a may have an upwardly convex shape.

As shown in FIGS. 1 and 3, the first nose edge 33 may extend between the first major cutting edge portion 36a and the second minor cutting edge portion 38b, and the second nose edge 35 may extend between the second major cutting edge portion 38a and the first minor cutting edge portion 36b.

Figure 2:
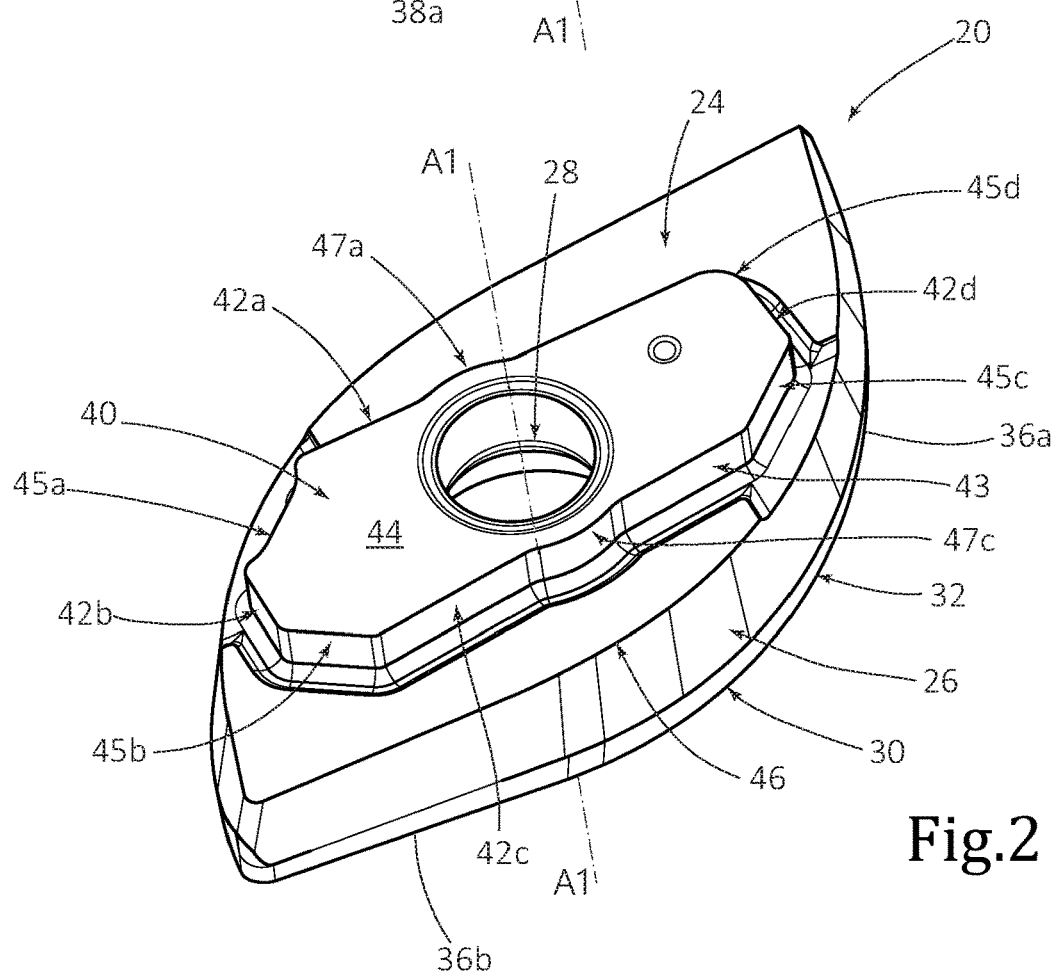
FIG. 2 is a lower perspective view of the cutting insert shown in FIG. 1.
Figure 4:
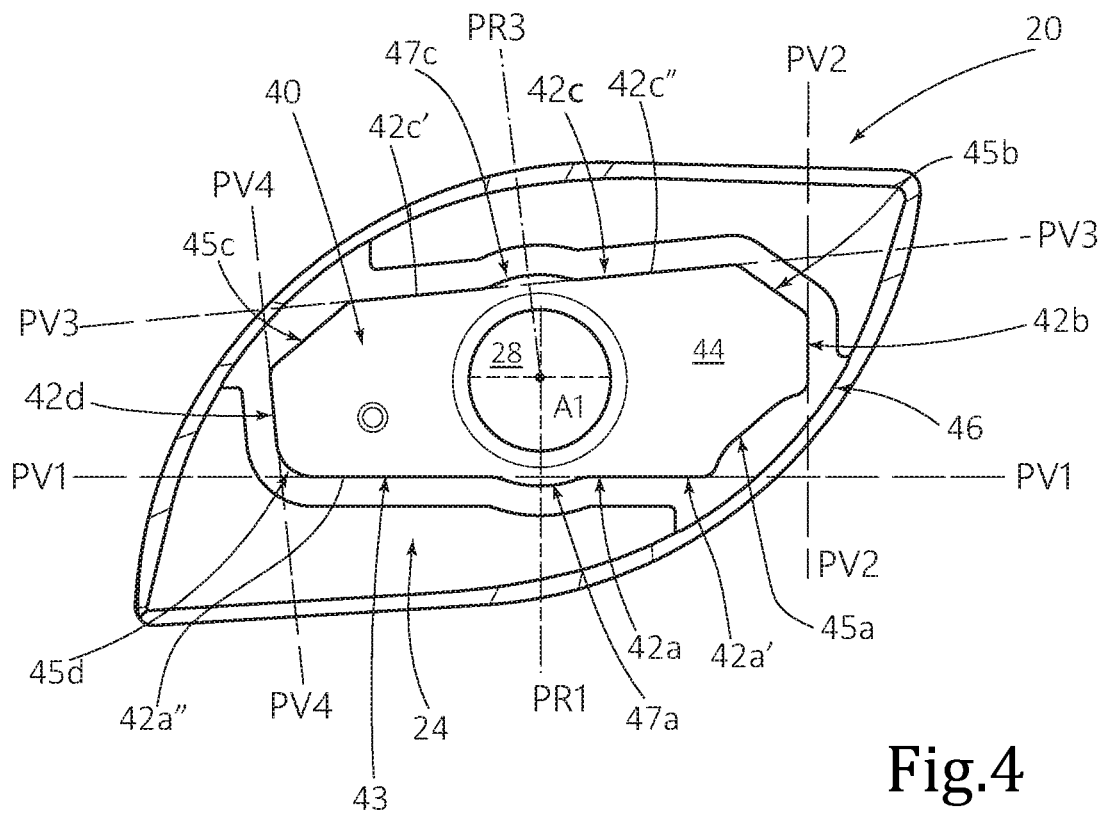
FIG. 4 is a bottom view of the cutting insert shown in FIG. 1.

As shown in FIGS. 2, 4 and 5, a lower central protuberance 40 extends downwardly from the lower surface 24 and away from the upper surface 22, and the lower central protuberance 40 includes first, second, third and fourth abutment walls 42a, 42b, 42c, 42d transverse to the lower surface 24.

The first, second, third and fourth abutment walls 42a, 42b, 42c, 42d are successively arranged on an envelope surface 43 extending around a perimeter of the lower central protuberance 40.

In some embodiments of the present invention, the lower central protuberance 40 may have a bottom surface 44, and the envelope surface 43 may extend from the lower surface 24 to the bottom surface 44.

Also, in some embodiments of the present invention, the through bore 28 may intersect the bottom surface 44.

As shown in FIG. 2, a continuous lower peripheral edge 46 is formed at the intersection of the lower surface 22 and the peripheral side surface 26.

In some embodiments of the present invention, the lower peripheral edge 46 may be devoid of cutting edges.

In some embodiments, by virtue of the lower central protuberance 40, the cutting insert 20 is single-sided (or "non-reversible), i.e., it cannot be indexed by flipping upside-down.

As shown in FIG. 4, in a bottom view of the cutting insert 20, each of the first, second, third and fourth abutment walls 42a, 42b, 42c, 42d may be located inside the lower peripheral edge 46.

In some embodiments of the present invention, in a bottom view of the cutting insert 20, the entire lower central protuberance 40 may be located inside the lower peripheral edge 46.

By virtue of having first, second, third and fourth abutment walls 42a, 42b, 42c, 42d, the lower central protuberance 40 may be used to removably secure the cutting insert 20 against radial and axial support surfaces of a cutting tool.

Thus, it should be appreciated that the insert's peripheral side surface 26 may be entirely spaced apart from surfaces of a cutting tool, so that the shape of the first and second upper cutting edges 32, 34, and portions of the peripheral side surface 26, which provide clearance for the first and second cutting edges 32, 34, may be optimized, with no geometrical constraints associated with removably securing the cutting insert 20 to a cutting tool.

Figure 6:
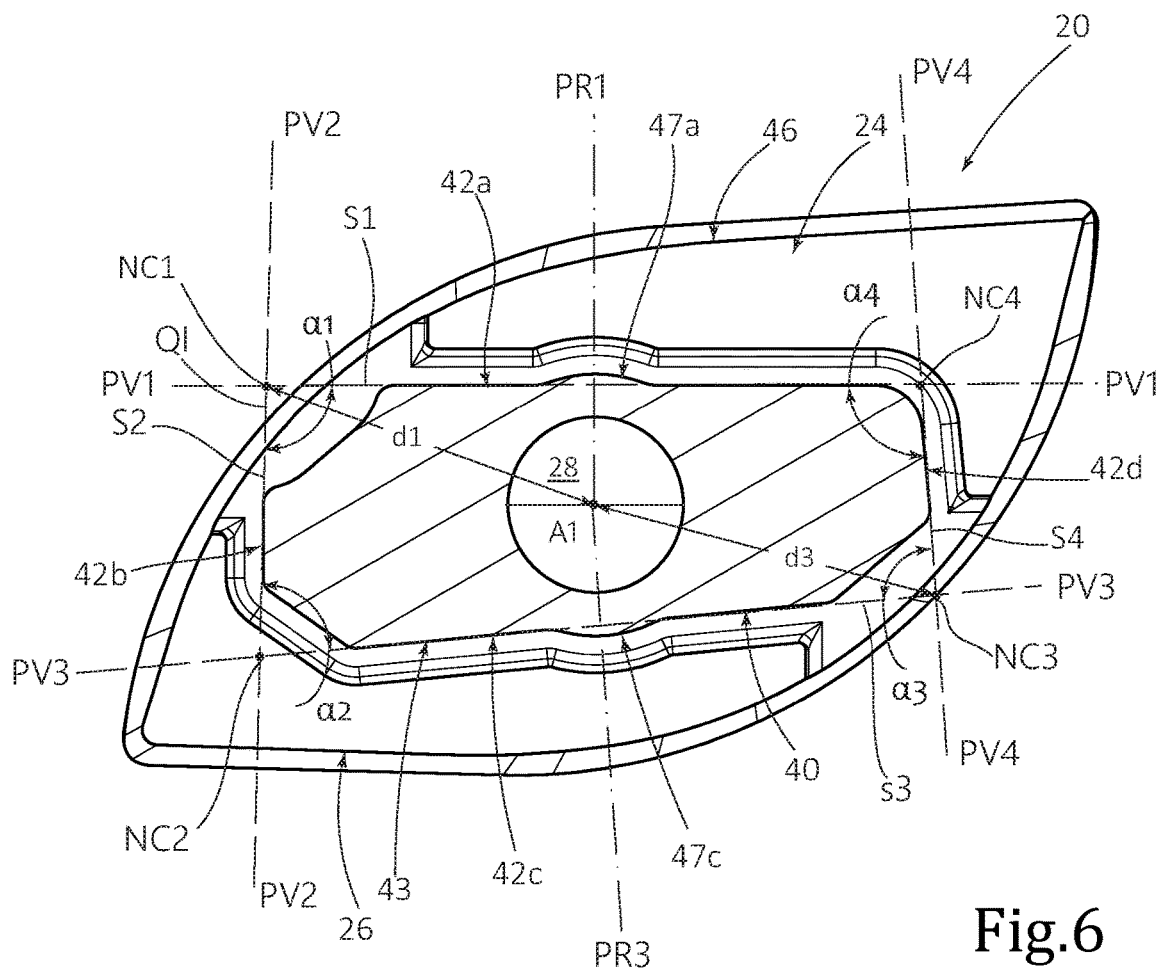
FIG. 6 is a cross-sectional view of the cutting insert shown in FIG. 5, taken along the line VI.

As shown in FIG. 6, in a cross-section taken in a first horizontal plane PH1 perpendicular to the insert axis A1 and intersecting the envelope surface 43, the first, second, third and fourth abutment walls 42a, 42b, 42c, 42d define an imaginary quadrilateral QI having diagonally opposing first and third internal angles $\alpha 1$, $\alpha 3$ and diagonally opposing second and fourth internal angles $\alpha 2$, $\alpha 4$.

Also, as shown in FIG. 6, the imaginary quadrilateral QI has first, second, third and fourth sides S1, S2, S3, S4 associated with the first, second, third and fourth abutment walls 42a, 42b, 42c, 42d, respectively, the first internal angle $\alpha 1$ formed between the first and second sides S1, S2, the second internal angle $\alpha 2$ formed between the second and third sides S2, S3, the third internal angle $\alpha 3$ formed between the third and fourth sides S3, S4, and the fourth internal angle $\alpha 4$ formed between the fourth and first sides S4, S1.

In some embodiments of the present invention, in the cross-section taken in the first horizontal plane PH1, each of the first, second, third and fourth abutment walls 42a, 42b, 42c, 42d may be straight.

Also, in some embodiments of the present invention, each of the first, second, third and fourth abutment walls 42a, 42b, 42c, 42d may be planar.

Further, in some embodiments of the present invention, each of the first, second, third and fourth abutment walls 42a, 42b, 42c, 42d may be parallel to the insert axis A1.

As shown in FIGS. 2, and 4, the envelope surface 43 may include first, second, third and fourth corner surfaces 45a, 45b, 45c, 45d, with the first corner surface 45a disposed between the first and second abutment walls 42a, 42b, the second corner surface 45b disposed between the second and third abutment walls 42b, 42c, the third corner surface 45c disposed between the third and fourth abutment walls 42e, 42d, and the fourth corner surface 45d disposed between the fourth and first abutment walls 42d. 42a.

As shown in FIG. 6, in the cross-section taken in the first horizontal plane PH1, the first corner surface 45a may be concave, the second and third corner surfaces 45b, 45c may be straight, and fourth corner surface 45d may be convex.

In some embodiments of the present invention, in the cross-section taken in the first horizontal plane PH1, the first, second, third and fourth corner surfaces 45a, 45b, 45c, 45d may be located inside the imaginary quadrilateral QI.

As shown in FIG. 4, the first abutment wall 42a may include two spaced apart first sub-walls 42a', 42a'', and the third abutment wall 42c may include two spaced apart third sub-walls 42c', 42c''.

In some embodiments of the present invention, as shown in FIG. 6, in the cross-section taken in the first horizontal plane Pill, the two first sub-walls 42a', 42a'' may be colinear and the two third sub-walls 42c', 42c'' may be colinear.

As shown in FIGS. 4 and 6, the two first sub-walls 42a', 42a'' may be spaced apart by a first bulge 47a, and the two third sub-walls 42c', 42c'' may be spaced apart by a third bulge 47c.

In some embodiments of the present invention, in the cross-section taken in the first horizontal plane PH1, the first and third bulges 47a, 47c may be located outside the imaginary quadrilateral QI.

Also, in some embodiments of the present invention, a first radial plane PRI containing the insert axis A1 and perpendicular to the first side S1 may intersect the first bulge 47a, and a third radial plane PR3 containing the insert axis A1 and perpendicular to the third side S3 may intersect the third bulge 47c.

As shown in FIG. 6, in the cross-section taken in the first horizontal plane Pill, the through bore 28 may be entirely located inside the imaginary quadrilateral QI.

For embodiments of the present invention in which the through bore 28 extends along the insert axis A1 and is entirely located inside the imaginary quadrilateral QI, it should be appreciated that the first and third bulges 47a, 47c advantageously provide the lower central protuberance 40 with an increased minimum wall thickness adjacent the through bore 28, thus increasing the strength of the cutting insert 20.

According to the present invention, the first and third internal angles α1, α3 are equal to each other and the second and fourth internal angles α2, α4 are not equal to each other. Thus, the imaginary quadrilateral QI may be described as an irregular quadrilateral.

In some embodiments of the present invention, both the second and fourth internal angles α2, α4 may differ from the first and third internal angles α1, α3.

Also, in some embodiments of the present invention, the second internal angle may be acute and the fourth internal angle α4 may be obtuse.

As shown in FIG. 6, in the cross-section taken in the first horizontal plane PH1, the sum of the second and fourth internal angles α2, α4 may be two times the value of either the first internal angle α1 or the third internal angle α3.

Thus, in some embodiments of the present invention, the first and third internal angles α1, α3 may be both right angles.

By virtue of the diagonally opposite second and fourth internal angles α2, α4 not being equal to each other, the imaginary quadrilateral QI may lack rotational symmetry (at any angle less than 360°) about the insert axis A1. In such case, the cutting insert 20 as a whole will lack rotational symmetry even if the first and second upper cutting edges 32, 34 are rotationally symmetric (at an angle less than 360°) about the insert axis A1.

As shown in FIG. 6, the imaginary quadrilateral QI has first, second, third and fourth corner points NC1, NC2, NC3, NC4 associated with the first, second, third and fourth internal angles α1, α2, α3, α4, respectively.

In some embodiments of the present invention, the first and third corner points NC1, NC3 may be located first and third distances d1, d3 from the insert axis A1, respectively, and the first and third distances d1, d3 may be equal to each other.

As shown in FIG. 6, in the cross-section taken in the first horizontal plane Pill, the first, second, third and fourth corner points NC1, NC2, NC3, NC4 may be located outside the lower central protuberance 40.

In some embodiments of the present invention, in the cross-section taken in the first horizontal plane PH1, at least one of the first and third corner points NC1, NC3 may be located outside the lower peripheral edge 46.

As shown in FIG. 6, each of the first and third sides S1, S3 may be longer than each of the second and fourth sides S2, S4.

In some embodiments of the present invention, the first and third sides S1, S3 may be non-parallel, and the second and fourth sides S2, S4 may be non-parallel.

As shown in FIGS. 3 and 6, a first vertical plane PV1 containing the first side S1 may intersect the first and second major cutting edge portions 36a, 38a, and a third vertical plane PV3 containing the third side S3 may intersect the first and second major cutting edge portions 36a, 38a.

Also as shown in FIGS. 3 and 6, a second vertical plane PV2 containing the second side S2 may intersect the second major cutting edge portion 38a and the first minor cutting edge portion 36b, and a fourth vertical plane PV4 containing the fourth side S4 may intersect the first major cutting edge portion 36a and the second minor cutting edge portion 38b.

Further, as shown in FIG. 3, the first nose edge 33 may be entirely located in one of the four spatial regions defined by the intersection of the first and fourth vertical planes PV1, PV4, and the second nose edge 35 may be entirely located in one of the four spatial regions defined by the intersection of the second and third vertical planes PV2, PV3.

In some embodiments of the present invention, the first, second, third and fourth vertical planes PV1, PV2, PV3, PV4 may be parallel to the insert axis A1.

As shown in FIGS. 7 to 13, another aspect of the present invention relates to a rotary cutting tool 48 rotatable about a tool axis AT in a direction of rotation RT.

The rotary cutting tool 48 comprises a tool body 50 having first and second insert receiving pockets 52, 54, and one of the above described cutting inserts 20 removably secured in each of the first and second insert receiving pockets 52, 54.

In some embodiments of the present invention, the tool body 50 may have an outer peripheral surface 56 interrupted by first and second cut-outs 58, 60, and the first and second insert receiving pockets 52, 54 may be formed in the first and second cut-outs 58, 60, respectively.

Also, in some embodiments of the present invention, the first and second cut-outs 58, 60 may be formed at an axial forward end 61 of the tool body 50.

Further, in some embodiments of the present invention, the first and second cut-outs 58, 60 may communicate with each other.

Yet further, in some embodiments of the present invention, the first and second cut-outs 58, 60 may include first and second chip gullets 62, 64, respectively.

Figure 7:
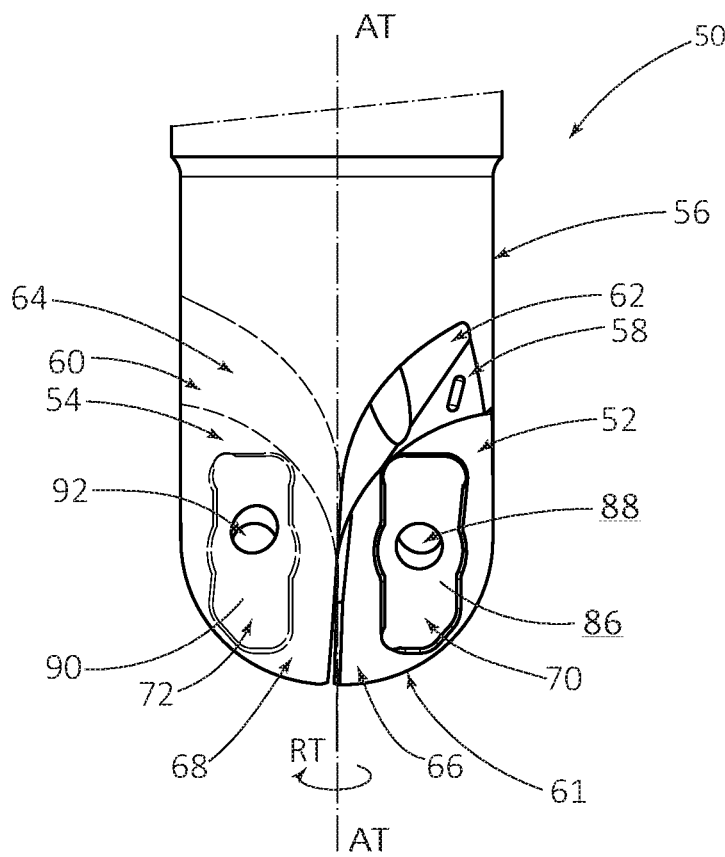
FIG. 7 is a side view of tool body in accordance with some embodiments of the present invention.

As shown in FIG. 7, the first and second insert receiving pockets 52, 54 may have first and second seat surfaces 66, 68, respectively, facing in the direction of rotation RT.

It should be appreciated that FIG. 7 shows the second insert receiving pocket 54, and features associated therewith, in hidden detail.

In some embodiments of the present invention, the first and second seat surfaces 66, 68 may intersect the circumferential outer peripheral surface 56.

Also, in some embodiments of the present invention, each of the first and second seat surfaces 66, 68 may be planar.

Figure 12:
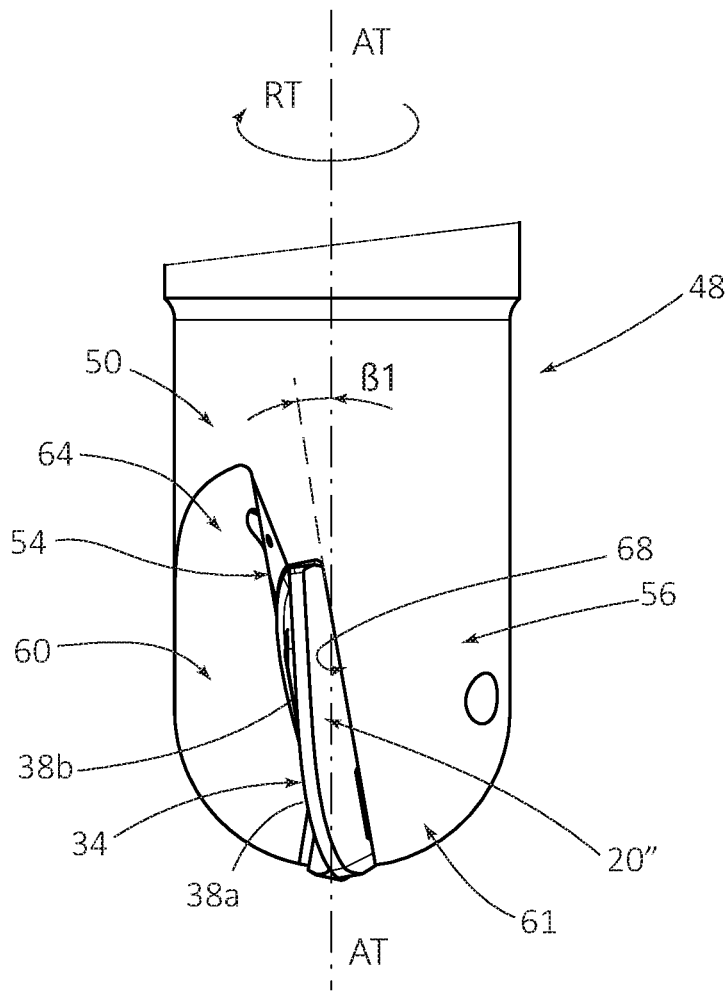
FIG. 12 is a second side view of the cutting tool shown in FIG. 10.

As shown in FIG. 12, in a side view of the cutting tool 48, the second seat surface 68 may be inclined at an acute slant angle β1 with respect to the tool axis AT, whereby the second seat surface's axial rear portion is disposed rotationally ahead of the second seat surface's axial forward portion.

In some embodiments of the present invention, the first seat surface 66 may also be inclined with respect to the tool axis AT, whereby the first seat surface's axial rear portion is disposed rotationally ahead of the first seat surface's axial forward portion.

Figure 13:
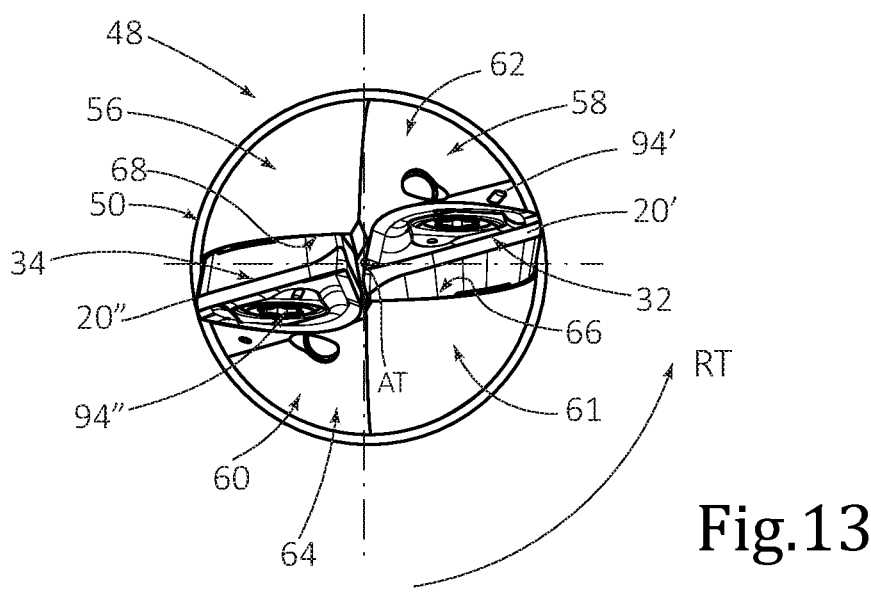
FIG. 13 is an end view of the cutting tool shown in FIG. 10.

As shown in FIGS. 12 and 13, the lower surface 24 of a first of the two cutting inserts 20' may face the first seat surface 66 and the lower surface 24 of a second of the two cutting inserts 20" may face the second seat surface 68.

In some embodiments of the present invention, the lower surface 24 of the first cutting insert 20' may be in contact with the first seat surface 66, and the lower surface 24 of the second cutting insert 20" may be in contact with the second seat surface 68.

As shown in FIGS. 10 to 13, the first upper cutting edge 32 of the first cutting insert 20' may be operative, and the second upper cutting edge 34 of the second cutting insert 20" may be operative.

In some embodiments of the present invention, the first and second nose edges 33, 35 may not be configured to perform cutting operations, and thus the first nose edge 33 of the first cutting insert 20' and the second nose edge 35 of the second cutting insert 20" may not engage a workpiece (not shown).

In some embodiments of the present invention, the rotary cutting tool 48 may be used for milling operations.

Also, in some embodiments of the present invention, the rotary cutting tool 48 may be in the form of a ball-nose end mill used in profiling and copying operations.

For some embodiments of the present invention, it should be appreciated that a substantial portion of the operative second upper cutting edge 34 of the second cutting insert 20" may be rotationally coincident about the tool axis AT with the operative first upper cutting edge 32 of the first cutting insert 20'.

As shown in FIG. 13, the first upper cutting edge 32 of the first cutting insert 20' may intersect the tool axis AT.

For embodiments of the present invention, in which the operative first upper cutting edge 32 of the first cutting insert 20' intersects the tool axis AT, it should be appreciated that the cutting tool 48 can advantageously perform cutting operations by advancing axially along the tool axis AT without leaving an uncut 'center leg' in the workpiece (not shown), which would otherwise require an additional cutting operation to remove, and could inadvertently cause cutting edge damage.

Figure 10:
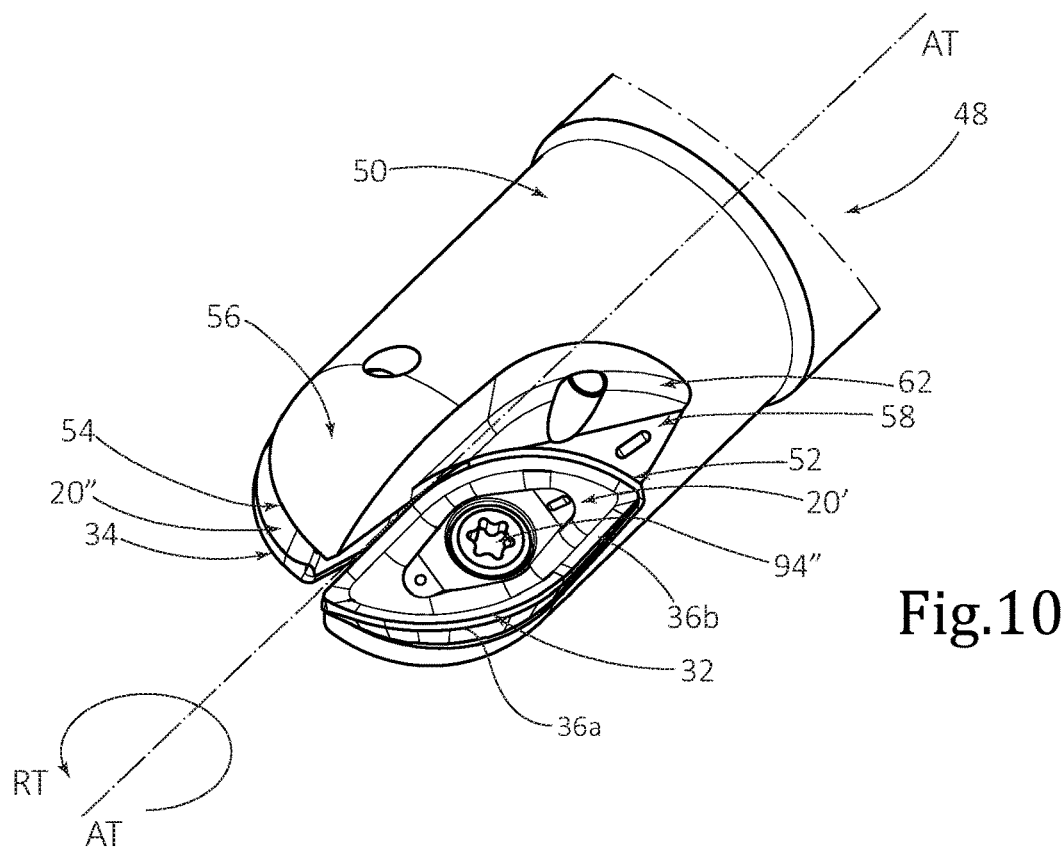
FIG. 10 is a perspective view of a cutting tool in accordance with some embodiments of the present invention.
Figure 11:
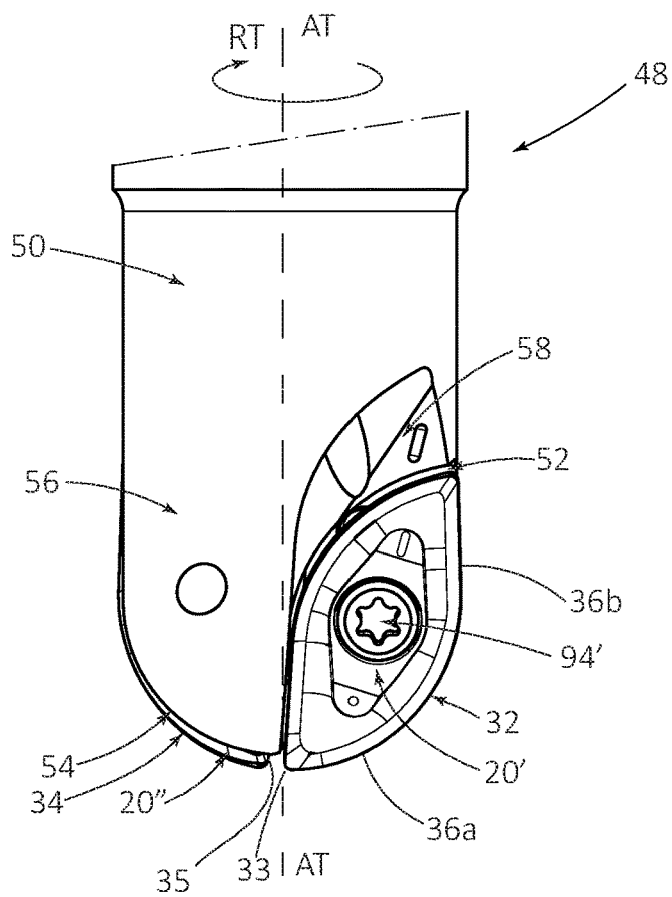
FIG. 11 is a first side view of the cutting tool shown in FIG. 10.

It should be appreciated that to improve visual clarity, FIGS. 10 to 12 show the tool axis AT unobstructed by the tool body 50.

Figures 8, 9:
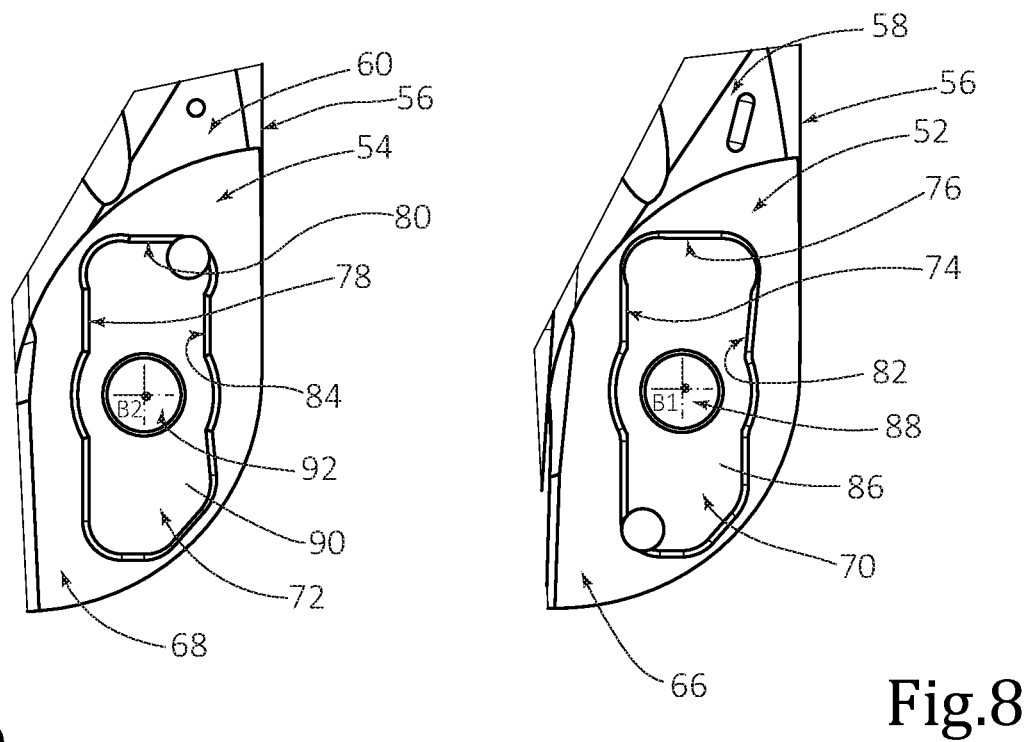
FIG. 8 is a top view of a first insert receiving pocket of the tool body shown in FIG. 7.
FIG. 9 is a top view of a second insert receiving pocket of the tool body shown in FIG. 7.

As shown in FIGS. 7 to 9, the first and second insert receiving pockets 52, 54 may include first and second recesses 70, 72 in the first and second seat surfaces 66, 68, respectively.

In some embodiments of the present invention, the first and second recesses 70, 72 may not intersect the outer peripheral surface 56.

Also, in some embodiments of the present invention, the first recess 70 may be circumferentially enclosed by the first seat surface 66, and the second recess 72 may be circumferentially enclosed by the second seat surface 68.

Further, in some embodiments of the present invention, the lower central protuberance 40 of the first cutting insert 20' may occupy the first recess 70, and the lower central protuberance 40 of the second cutting insert 20" may occupy the second recess 72.

As shown in FIGS. 7 to 9, the first recess 70 may include spaced apart first radial and first axial support surfaces 74, 76 and the second recess 72 may include spaced apart second radial and second axial support surfaces 78, 80.

Figure 14:
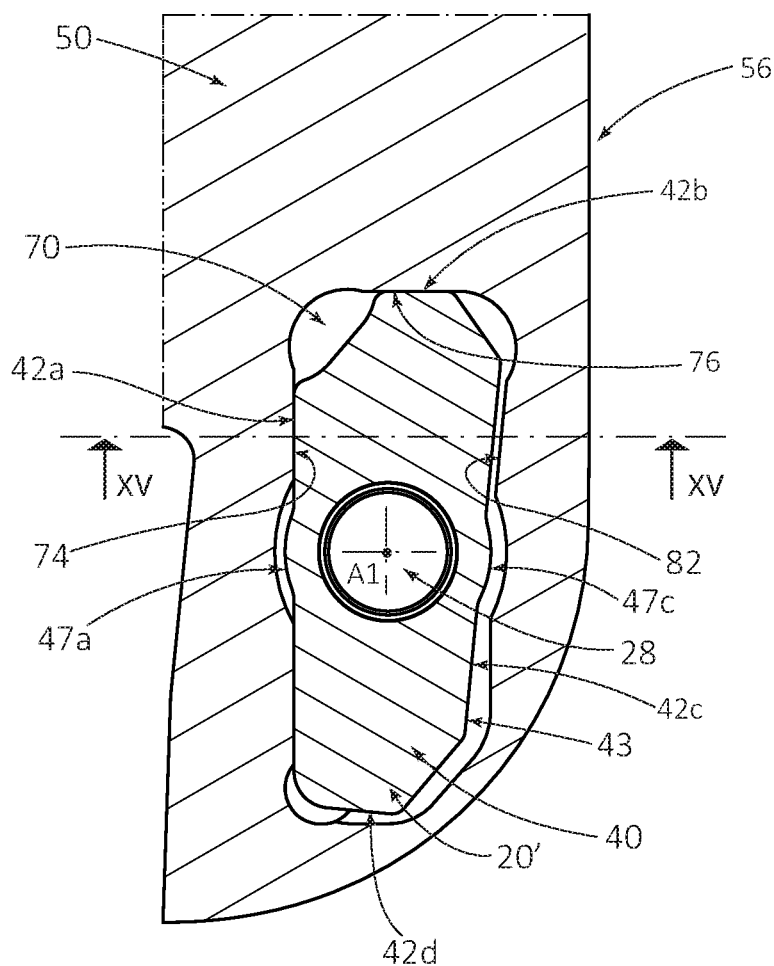
FIG. 14 is a cross-sectional view of the cutting tool shown in FIG. 10, associated with the first insert receiving pocket.
Figure 16:
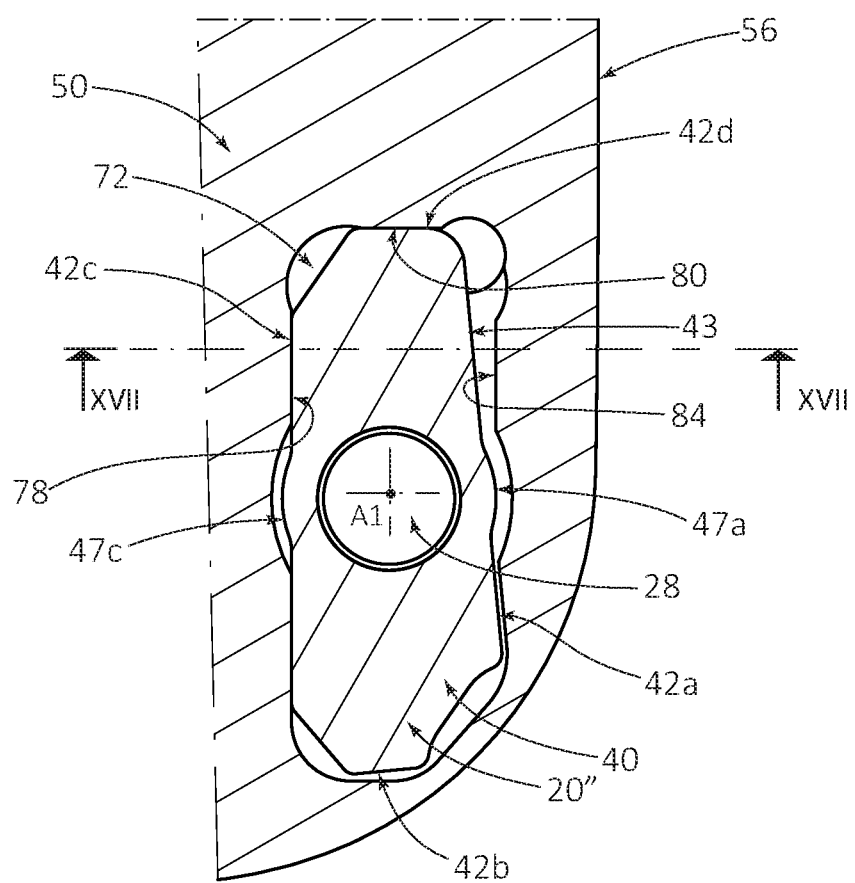
FIG. 16 is a cross-sectional view of the cutting tool shown in FIG. 10, associated with the second insert receiving pocket.

In some embodiments of the present invention, as shown in FIGS. 14 and 16, the first and second abutment walls 42a, 42b of the first cutting insert 20' may be in contact with the first radial and first axial support surfaces 74, 76, respectively, and the third and fourth abutment walls 42c, 42d of the second cutting insert 20" may be in contact with the second radial and second axial support surfaces 78, 80, respectively.

It should be appreciated that FIGS. 14 and 16 are detailed cross-sectional views of the cutting tool 48, taken parallel to the first and second seat surfaces 66, 68 of the first and second insert receiving pockets 52, 54, respectively.

By virtue of the first internal angle α1 being associated with the first and second abutment walls 42a, 42b, the third internal angle α3 being associated with the third and fourth abutment walls 42c, 42d, and the first and third internal angles α1, α3 being equal, it should be appreciated that the first radial and first axial support surfaces 74, 76 of the first recess 70 may have a corresponding configuration to the second radial and second axial support surfaces 78, 80 of the second recess 72, so that the first and second cutting inserts 20', 20" may be removably secured in their respective first and second insert receiving pockets 52, 54 with a correspondingly high level of stability.

In some embodiments of the present invention, the lower central protuberance 40 of the first cutting insert 20' may only occupy the first recess 70 in a single mounting position, in which the first and second abutment walls 42a, 42b face the first radial and first axial support surfaces 74, 76, respectively, and the lower central protuberance 40 of the second cutting insert 20" may only occupy the second recess 72 in a single mounting position, in which the third and fourth abutment walls 42c, 42d face the second radial and second axial support surfaces 78, 80, respectively.

For such embodiments of the present invention, it should be appreciated that when the operative first upper cutting edge 32 of the first cutting insert 20' is worn or used, the first cutting insert 20' cannot be inadvertently 'indexed' in the first recess 70 of the first insert receiving pocket 52. Similarly, when the operative second upper cutting edge 34 of the second cutting insert 20" is worn or used, the second cutting insert 20" cannot be inadvertently 'indexed' in the second recess 72 of the second insert receiving pocket 54. Such a 'fool-proof' arrangement prevents incorrect assembly of the cutting tool 48.

It should be appreciated that use of the term 'indexed' in the preceding paragraph, refers to the removal, approximate 180° rotation about the insert axis A1, and attempted replacement of the first and second inserts 20', 20" in their respective first and second insert receiving pockets 52, 54.

Whilst a cutting insert 20 may not be indexed and put back in the same insert receiving pocket 52, 54, it may be placed in the other insert receiving pocket 54, 52. In other words, once the operative upper cutting edges 32, 34 of a pair of inserts used in the same tool body are worn, the inserts may be switched. This allows identical inserts to be used in both insert pockets, the insert in each pocket having a different operative cutting edge. The upper cutting edges 32, 34 may be numbered and/or provided with wear indicators to help an operator keep track of which cutting edge has already been used.

As shown in FIGS. 7 to 9, at least a portion of the first radial support surface 74 and at least a portion of the second radial support surface 78 may be rotationally coincident about the tool axis AT.

In some embodiments of the present invention, the aforementioned portion of the first radial support surface 74 and the aforementioned portion of the second radial support surface 78 may exhibit 2-fold rotational symmetry about the tool axis AT.

As shown in FIGS. 7 to 9, at least a portion of the first axial support surface 76 and at least a portion of the second axial support surface 80 may be rotationally coincident about the tool axis AT.

In some embodiments of the present invention, the aforementioned portion of the first axial support surface 76 and the aforementioned portion of the second axial support surface 80 may exhibit 2-fold rotational symmetry about the tool axis AT.

For embodiments of the present invention, in which at least a portion of the first radial support surface 74 and at least a portion of the second radial support surface 78 are rotationally coincident about the tool axis AT, and at least a portion of the first axial support surface 76 and at least a portion of the second axial support surface 80 are rotationally coincident about the tool axis AT, it should be appreciated that the first and second recesses 70, 72 of the first and second insert receiving pockets 52, 54 may provide an equivalent level of radial and axial support for the first and second cutting inserts 20', 20".

Also, for embodiments of the present invention, in which at least a portion of the first radial support surface 74 and at least a portion of the second radial support surface 78 are rotationally coincident about the tool axis AT, and at least a portion of the first axial support surface 76 and at least a portion of the second axial support surface 80 are rotationally coincident about the tool axis AT, it should be appreciated that an alternative cutting tool assembly may be configured, in which two identical cutting inserts having 2-fold rotational symmetry, as described in the above referenced U.S. Pat. No. 6,536,996, are removably secured in the first and second insert receiving pockets 52, 54 of the tool body 50.

As shown in FIGS. 7 to 9, the first recess 70 may include a first radial stopping wall 82 facing the first radial support surface 74, and the second recess 72 may include a second radial stopping wall 84 facing the second radial support surface 78.

In some embodiments of the present invention, the third and fourth abutment walls 42e, 42d of the first cutting insert 20' may not be in contact with the first recess 70, and the first and second abutment walls 42a, 42b of the second cutting insert 20" may not be in contact with the second recess 72.

Figure 15:
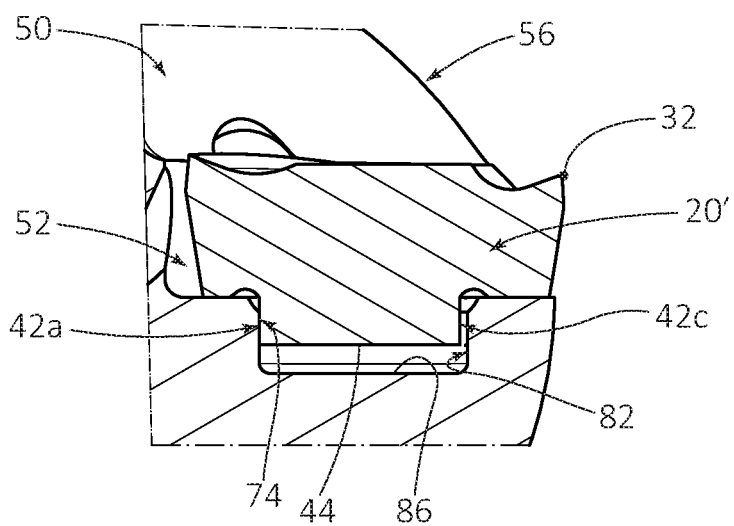
FIG. 15 is a cross-sectional view of the cutting tool shown in FIG. 14, taken along the line XV-XV.
Figure 17:
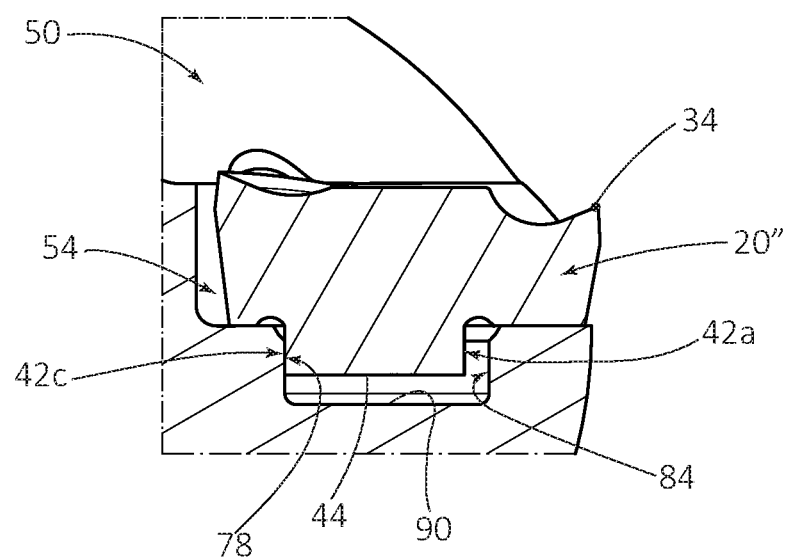
FIG. 17 is a cross-sectional view of the cutting tool shown in FIG. 16, taken along the line XVII-XVII.

Thus, it should be appreciated that in some embodiments of the present invention, as shown in FIGS. 15 and 17, the first radial stopping wall 82 may be spaced apart from the third abutment wall 42e of the first cutting insert 20', and the second radial stopping wall 84 may be spaced apart from the first abutment wall 42a of the second cutting insert 20".

For embodiments of the present invention in which the first radial stopping wall 82 is spaced apart from the third abutment wall 42c of the first cutting insert 20', and the second radial stopping wall 84 is spaced apart from the first abutment wall 42a of the second cutting insert 20", it should be appreciated that the presence and position of the first radial stopping wall 82 in the first recess 70 physically prevents inadvertent 'indexing of the first cutting insert 20' therein, and the presence and position of the second radial stopping wall 84 in the second recess 72 physically prevents inadvertent 'indexing' of the second cutting insert 20" therein.

It should also be appreciated that the presence and position of the first radial stopping wall 82 in the first recess 70 physically prevents any cutting insert 20 from being mounted therein and oriented such that its second upper cutting edge 34 is operative, and the presence and position of the second radial stopping wall 84 in the second recess 72 physically prevents any cutting insert 20 from being mounted therein and oriented such that its first upper cutting edge 32 is operative.

In some embodiments of the present invention, apart from the first and second abutment walls 42a, 42b of the first cutting insert 20' being in contact with the first radial and first axial support surfaces 74, 76, respectively, no other surface of the first cutting insert's envelope surface 43 may be in contact with the first recess 70, and apart from the third and fourth abutment walls 42c, 42d of the second cutting insert 20" being in contact with the second radial and second axial support surfaces 78, 80, respectively, no other surface of the second cutting insert's envelope surface 43 may be in contact with the second recess 72.

As shown in FIGS. 8 and 9, the first recess 70 may include a first floor surface 86 with a first threaded bore 88 therein, and the second recess 72 may include a second floor surface 90 with a second threaded bore 92 therein.

As shown in FIGS. 15 and 17, the bottom surface 44 of the lower central protuberance 40 of the first cutting insert 20' may be spaced apart from the first floor surface 86, and the bottom surface 44 of the lower central protuberance 40 of the second cutting insert 20" may be spaced apart from the second floor surface 90.

In some embodiments of the present invention, a first clamping screw 94' may pass through the through bore 28 of the first cutting insert 20' and threadingly engage the first threaded bore 88, and a second clamping screw 94" may pass through the through bore 28 of the second cutting insert 20' and threadingly engage the second threaded bore 92.

It should be appreciated that the first clamping screw 94' and the second clamping screw 94" may be identical.

Also, in some embodiments of the present invention, the first threaded bore 88 may extend along a first threaded bore axis B1, and the insert axis A1 of the first cutting insert 20' may be non-coaxial with the first threaded bore axis B1, and the second threaded bore 92 may extend along a second threaded bore axis B2, and the insert axis A1 of the second cutting insert 20" may be non-coaxial with the second threaded bore axis B2.

For such embodiments of the present invention, the through bore 28 of the first cutting insert 20' may be eccentric in relation to the first threaded bore 88, and the through bore 28 of the second cutting insert 20" may be eccentric in relation to the second threaded bore 92.

It should be appreciated that the eccentric relationship of the through bore 28 of the first cutting insert 20' and the first threaded bore 88, promotes contact between the first and second abutment walls 42a, 42b of the first cutting insert 20' and the first radial and first axial support surfaces 74, 76, respectively, on tightening of the first clamping screw 94'. It should also be appreciated that the eccentric relationship of the through bore 28 of the second cutting insert 20" and the second threaded bore 92, promotes contact between the third and fourth abutment walls 42c, 42d of the second cutting insert 20" and the second radial and second axial support surfaces 78, 80, respectively, on tightening of the second clamping screw 94".

Although the present invention has been described to a certain degree of particularity, it should be understood that various alterations and modifications could be made without departing from the spirit or scope of the invention as hereinafter claimed.

What is claimed is:

1. A single-sided cutting insert (20), comprising:
opposing upper and lower surfaces (22, 24) interconnected by a peripheral side surface (26) and an insert axis (A1) passing through the upper and lower surfaces (22, 24),
an upper peripheral edge (30) at the intersection of the upper surface (22) and the peripheral side surface (26), the upper peripheral edge (30) having first and second upper cutting edges (32, 34), and
a lower central protuberance (40) extending downwardly from the lower surface (24) and away from the upper surface (22), the lower central protuberance (40) including first, second, third and fourth abutment walls (42a, 42c, 42b, 42d) transverse to the lower surface (24), the first, second, third and fourth abutment walls (42a, 42c, 42b, 42d) sequentially arranged on an envelope surface (43) extending around a perimeter of the lower central protuberance (40),
wherein in a cross-section taken in a first horizontal plane (PH1) perpendicular to the insert axis (A1) and intersecting the envelope surface (43), the first, second, third and fourth abutment walls (42a, 42b, 42c, 42d) define an imaginary quadrilateral (QI) having diagonally opposing first and third internal angles ($\alpha 1$, $\alpha 3$) and diagonally opposing second and fourth internal angles ($\alpha 2$, $\alpha 4$),
wherein the imaginary quadrilateral (QI) has first, second, third and fourth sides (S1, S2, S3, S4) associated with the first, second, third and fourth abutment walls (42a, 42b, 42c, 42d), respectively, the first internal angle ($\alpha 1$) formed between the first and second sides (S1, S2), the second internal angle ($\alpha 2$) formed between the second and third sides (S2, S3), the third internal angle ($\alpha 3$) formed between the third and fourth sides (S3, S4), and the fourth internal angle ($\alpha 4$) formed between the fourth and first sides (S4, S1), and wherein the first and third internal angles ($\alpha 1$, $\alpha 3$) are equal to each other, and the second and fourth internal angles ($\alpha 2$, $\alpha 4$) are not equal to each other.

2. The cutting insert (20) according to claim 1, wherein the upper peripheral edge (30) lacks rotational symmetry about the insert axis (A1).

3. The cutting insert (20) according to claim 1, wherein the first and second upper cutting edges (32, 34) are non-identical.

4. The cutting insert (20) according to claim 1, wherein in the cross-section taken in the first horizontal plane (PH1), each of the first, second, third and fourth abutment walls (42a, 42b, 42c, 42d) is straight.

5. The cutting insert (20) according to claim 1, wherein a through bore (28) extends along the insert axis (A1).

6. The cutting insert (20) according to claim 5, wherein in the cross-section taken in the first horizontal plane (P1), the through bore (28) is entirely located inside the imaginary quadrilateral (QI).

7. The cutting insert (20) according to claim 1, wherein the second internal angle ($\alpha 2$) is acute and the fourth internal angle ($\alpha 4$) is obtuse.

8. The cutting insert (20) according to claim 1, wherein the first and third internal angles ($\alpha 1$, $\alpha 3$) are both right angles.

9. The cutting insert (20) according to claim 1, wherein:
a lower peripheral edge (46) is formed at the intersection of the lower surface (22) and the peripheral side surface (26), and
in a bottom view of the cutting insert (20), each of the first, second, third and fourth abutment walls (42a, 42b, 42c, 42d) is located inside the lower peripheral edge (46).

10. The cutting insert (20) according to claim 1, wherein: each of the first and third sides (S1, S3) is longer than each of the second and fourth sides (S2, S4).

11. The cutting insert (20) according to claim 1, wherein:
the first upper cutting edge (32) includes a first major cutting edge portion (36a) and a first minor cutting edge portion (36b),
the second upper cutting edge (34) includes a second major cutting edge portion (38a) and a second minor cutting edge portion (38b), and
in a top view of the cutting insert (20);
each of the first and second major cutting edge portions (36a, 38a) has an outwardly convex shape, and
each of the first and second minor cutting edge portions (36b, 38b) is straight.

12. The cutting insert (20) according to claim 11, wherein:
a first vertical plane (PV1) containing the first side (S1) intersects the first and second major cutting edge portions (36a, 38a), and
a third vertical plane (PV3) containing the third side (S3) intersects the first and second major cutting edge portions (36a, 38a).

13. The cutting insert (20) according to claim 11, wherein:
a second vertical plane (PV2) containing the second side (S2) intersects the second major cutting edge portion (38a) and the first minor cutting edge portion (36b), and
a fourth vertical plane (PV4) containing the fourth side (S4) intersects the first major cutting edge portion (36a) and the second minor cutting edge portion (38b).

14. A rotary cutting tool (48) rotatable about a tool axis (AT) in a direction of rotation (RT), comprising:
a tool body (50) having first and second insert receiving pockets (52, 54); and one cutting insert (20) in accordance with claim 1 removably secured in each of the first and second insert receiving pockets (52, 54).

15. The rotary cutting tool (48) according to claim 14, wherein:
the first and second insert receiving pockets (52, 54) have first and second seat surfaces (66, 68), respectively, facing in the direction of rotation (RT), and
the lower surface (24) of a first of the two cutting inserts (20') faces the first seat surface (66) and the lower surface (24) of a second of the two cutting inserts (20") faces the second seat surface (68).

16. The rotary cutting tool (48) according to claim 15, wherein:
the first upper cutting edge (32) of the first cutting insert (20') is operative, and
the second upper cutting edge (34) of the second cutting insert (20") is operative.

17. The rotary cutting tool (48) according to claim 16, wherein the first upper cutting edge (32) of the first cutting insert (20') intersects the tool axis (AT).

18. The rotary cutting tool (48) according to claim 15, wherein:
the first and second insert receiving pockets (52, 54) include first and second recesses (70, 72) in the first and second seat surfaces (66, 68), respectively, and
the lower central protuberance (40) of the first cutting insert (20') occupies the first recess (70), and
the lower central protuberance (40) of the second cutting insert (20") occupies the second recess (72).

19. The rotary cutting tool (48) according to claim 18, wherein:
the first recess (70) includes spaced apart first radial and first axial support surfaces (74, 76) and the second recess (72) includes spaced apart second radial and second axial support surfaces (78, 80), and
the first and second abutment walls (42a, 42b) of the first cutting insert (20') are in contact with the first radial and first axial support surfaces (74, 76), respectively, and the third and fourth abutment walls (42c, 42d) of the second cutting insert (20") are in contact with the second radial and second axial support surfaces (74, 76), respectively.

20. The rotary cutting tool (48) according to claim 19, wherein:
at least a portion of the first radial support surface (74) and at least a portion of the second radial support surface (78) have 180° rotational symmetry about the tool axis (AT).

21. The rotary cutting tool (48) according to claim 19, wherein:
at least a portion of the first axial support surface (76) and at least a portion of the second axial support surface (80) have 180° rotational symmetry about the tool axis (AT).

22. The rotary cutting tool (48) according to claim 19, wherein:
the third and fourth abutment walls (42c, 42d) of the first cutting insert (20') are not in contact with the first recess (70), and
the first and second abutment walls (42a, 42b) of the second cutting insert (20") are not in contact with the second recess (72).

23. The rotary cutting tool (48) according to claim 19, wherein:
the lower central protuberance (40) of the first cutting insert (20') is only capable of occupying the first recess (70) in a single mounting position, in which the first and second abutment walls (42a, 42b) face the first radial and first axial support surfaces (74, 76), respectively, and
the lower central protuberance (40) of the second cutting insert (20") is only capable of occupying the second recess (72) in a single mounting position, in which the third and fourth abutment walls (42c, 42d) face the second radial and second axial support surfaces (78, 80), respectively.

24. A single-sided cutting insert (20), comprising:
opposing upper and lower surfaces (22, 24) interconnected by a peripheral side surface (26) and an insert axis (A1) passing through the upper and lower surfaces (22, 24),
a through bore (28) extending along the insert axis (A1) and connecting the upper and lower surfaces (22, 24),
an upper peripheral edge (30) at the intersection of the upper surface (22) and the peripheral side surface (26), the upper peripheral edge (30) having first and second upper cutting edges (32, 34) which are spaced apart from one another by opposing first and second nose edges (33, 35), and
a lower central protuberance (40) extending downwardly from the lower surface (24) and away from the upper surface (22), the lower central protuberance (40) having an envelope surface (23) extending around a perimeter thereof and including sequentially arranged first, second, third and fourth abutment walls (42a, 42c, 42b, 42d) transverse to the lower surface (24), wherein:
in a cross-section taken in a first horizontal plane (PH1) perpendicular to the insert axis (A1) and intersecting the envelope surface (43), the first, second, third and fourth abutment walls (42a, 42b, 42c, 42d) define an imaginary quadrilateral (QI) through which the insert axis (A1) passes;
the imaginary quadrilateral (QI) lacks rotational symmetry about the insert axis (A1);
in the cross-section taken in the first horizontal plane (PH1), the through bore (28) is entirely located inside the imaginary quadrilateral (QI); and
the first and second upper cutting edges (32, 34) lack rotational symmetry about the insert axis (A1).

25. The single-sided cutting insert (20) according to claim 24, wherein the imaginary quadrilateral (QI) comprises:
diagonally opposing first and third internal angles (α1, α3) which are equal to one another, and
diagonally opposing second and fourth internal angles (α2, α4) which are unequal to one another and also unequal to both the first and third internal angles (α1, α3).

26. A single-sided cutting insert (20), comprising:
opposing upper and lower surfaces (22, 24) interconnected by a peripheral side surface (26) and an insert axis (A1) passing through the upper and lower surfaces (22, 24),
a through bore (28) extending along the insert axis (A1) and connecting the upper and lower surfaces (22, 24),
an upper peripheral edge (30) at the intersection of the upper surface (22) and the peripheral side surface (26), the upper peripheral edge (30) having first and second upper cutting edges (32, 34) which are spaced apart from one another by opposing first and second nose edges (33, 35), and
a lower central protuberance (40) extending downwardly from the lower surface (24) and away from the upper surface (22), the lower central protuberance (40) having an envelope surface (23) extending around a perimeter thereof and including sequentially arranged first, second, third and fourth abutment walls (42a, 42c, 42b, 42d) transverse to the lower surface (24), wherein:

in a cross-section taken in a first horizontal plane (PH1) perpendicular to the insert axis (A1) and intersecting the envelope surface (43), the first, second, third and fourth abutment walls (42a, 42b, 42c, 42d) define an imaginary quadrilateral (QI) through which the insert axis (A1) passes;

the imaginary quadrilateral (QI) lacks rotational symmetry about the insert axis (A1);

the first and second upper cutting edges (32, 34) lack rotational symmetry about the insert axis (A1); and the imaginary quadrilateral (QI) comprises:
  diagonally opposing first and third internal angles ($\alpha 1$, $\alpha 3$) which are equal to one another, and
  diagonally opposing second and fourth internal angles ($\alpha 2$, $\alpha 4$) which are unequal to one another and also unequal to both the first and third internal angles ($\alpha 1$, $\alpha 3$).

* * * * *